United States Patent
Suzuki et al.

(10) Patent No.: US 10,637,024 B2
(45) Date of Patent: Apr. 28, 2020

(54) ARRANGEMENT STRUCTURE OF ELECTRICAL COMPONENTS

(71) Applicant: HONDA MOTOR CO., LTD., Tokyo (JP)

(72) Inventors: Shota Suzuki, Wako (JP); Haruka Tsuda, Wako (JP); Kunihiro Kai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/363,726

(22) Filed: Mar. 25, 2019

(65) Prior Publication Data
US 2019/0305276 A1    Oct. 3, 2019

(30) Foreign Application Priority Data
Mar. 28, 2018    (JP) .................................. 2018-062304

(51) Int. Cl.
*H01M 2/10*    (2006.01)
*B60R 16/02*    (2006.01)
(Continued)

(52) U.S. Cl.
CPC ....... *H01M 2/1083* (2013.01); *B60R 16/0215* (2013.01); *B60R 16/04* (2013.01); *B62K 11/02* (2013.01); *H01M 2220/20* (2013.01)

(58) Field of Classification Search
CPC . H01M 2/1083; H01M 2220/20; B60R 16/04; B60R 16/0215; B62K 11/02
See application file for complete search history.

(56) References Cited

U.S. PATENT DOCUMENTS

| 7,665,570 B2 * | 2/2010 | Okada .................... B60R 16/04 180/443 |
| 7,730,985 B2 * | 6/2010 | Oohashi .................. B62J 23/00 180/219 |

(Continued)

FOREIGN PATENT DOCUMENTS

| CN | 103097235 B | 10/2015 |
| CN | 105593112 A | 5/2016 |

(Continued)

OTHER PUBLICATIONS

Japanese Office Action for Japanese Application No. 2018-062304, dated Oct. 30, 2019, with an English translation.

(Continued)

*Primary Examiner* — Erez Gurari
(74) *Attorney, Agent, or Firm* — Birch, Stewart, Kolasch & Birch, LLP

(57) ABSTRACT

An arrangement structure of electrical components can efficiently place a plurality of harnesses while a plurality of electrical components are disposed near a vehicle-mounted battery. The arrangement structure is applied to a saddled vehicle having an electrical component box that is disposed between main frames and an engine and houses at least an approximately rectangular shape battery. The electrical component box includes: a battery tray that covers at least a body front surface and a body upper surface of the battery; a lower half that houses the battery and the battery tray; and an upper half that covers the lower half from above. A first electrical component and a first harness group are arranged in housing spaces formed between the battery tray and the electrical component box. A second electrical component and a second harness group are arranged on the upper side of the upper half.

20 Claims, 12 Drawing Sheets

(51) Int. Cl.
  *B62K 11/02*   (2006.01)
  *B60R 16/04*   (2006.01)

(56) References Cited

U.S. PATENT DOCUMENTS

| | | | | |
|---|---|---|---|---|
| 8,602,139 | B2* | 12/2013 | Takamura | B60K 1/04 |
| | | | | 180/65.1 |
| 8,794,366 | B2* | 8/2014 | Taguchi | B60R 16/04 |
| | | | | 180/68.5 |
| 9,579,983 | B2* | 2/2017 | Inoue | B62K 19/30 |
| 9,660,236 | B2* | 5/2017 | Kondo | B62M 6/90 |
| 9,776,493 | B2* | 10/2017 | Ono | B60K 1/04 |
| 10,160,509 | B2* | 12/2018 | Tani | B62J 23/00 |
| 2005/0211488 | A1* | 9/2005 | Gore | B62M 7/00 |
| | | | | 180/219 |
| 2012/0103706 | A1* | 5/2012 | Kondo | B62M 7/12 |
| | | | | 180/65.1 |
| 2013/0161108 | A1* | 6/2013 | Watanabe | B62M 7/12 |
| | | | | 180/220 |
| 2016/0137249 | A1* | 5/2016 | Sasage | B62J 6/18 |
| | | | | 180/219 |
| 2016/0280306 | A1* | 9/2016 | Miyashiro | B62K 11/04 |
| 2019/0305276 | A1* | 10/2019 | Suzuki | B60R 16/04 |

FOREIGN PATENT DOCUMENTS

| | | |
|---|---|---|
| CN | 103569267 B | 6/2016 |
| EP | 2692621 A2 | 2/2014 |
| JP | 2008-247332 A | 10/2008 |
| JP | 2012-197074 A | 10/2012 |
| JP | 2016-30581 A | 3/2016 |

OTHER PUBLICATIONS

Taiwanese Office Action and Search Report, dated Nov. 6, 2019, for Taiwanese Application No. 108110315, with a partial English translation.

* cited by examiner

ARRANGEMENT STRUCTURE OF ELECTRICAL COMPONENTS

TECHNICAL FIELD

The present invention relates to an arrangement structure of electrical components, and in particular relates to an arrangement structure of electrical components in which various types of electrical components and harnesses are densely arranged around a vehicle-mounted battery.

BACKGROUND ART

A configuration of a vehicle such as a motorcycle has been known, in which configuration a battery box that houses a vehicle-mounted battery is provided and various types of electrical components are arranged near this battery box.

Patent Literature 1 discloses a motorcycle in which electrical components such as a fuse box or a starter magnet are arranged near a battery box.

PRIOR ART DOCUMENT

Patent Document

Patent Document 1 Japanese Patent Laid-Open No. 2008-247332

SUMMARY OF INVENTION

Solution to Problem

Since, if a plurality of electrical components are disposed near a battery box, harnesses connected to the respective electrical components are also arranged densely, placement of the harnesses becomes complicated, and additionally interference between the harnesses or interference between the harnesses and other parts easily occurs. In the arrangement structure of electrical components disclosed in Patent Literature 1, it is not examined to avoid interference between high voltage harnesses that lie next to a battery and other harnesses or to enhance maintainability by sorting harnesses into harness groups and placing them as such harness groups.

An object of the present invention is to provide an arrangement structure of electrical components that can efficiently place a plurality of harnesses while a plurality of electrical components are disposed near a vehicle-mounted battery.

Solution to Problems

To achieve the afore-mentioned object, the present invention has a first feature in an arrangement structure of electrical components applied to a saddled vehicle (1) comprising a pair of right and left main frames (F2) extending behind a head tube (F1), an engine (E) disposed underneath the main frames (F2), and an electrical component box (40) that is disposed between the main frames (F2) and the engine (E) as seen in a side view of the vehicle and houses at least an approximately rectangular shape battery (B), wherein the electrical component box (40) includes: a battery tray (61) that covers at least a body front surface (B1) and a body upper surface (B2) of the battery (B); a lower half (71) that houses the battery (B) and the battery tray (61); and an upper half (51) that covers the lower half (71) from above, a first electrical component (98) and a first harness group (H1) are arranged in housing spaces (S1, S2) formed between the battery tray (61) and the electrical component box (40), and a second electrical component (80) and a second harness group (H2) are arranged on an upper side of the upper half (51).

The present invention has a second feature in that at least one of the first harness group (H1) are high voltage harnesses.

The present invention has a third feature in that at least one of the second harness group (H2) are low voltage harnesses connected to accessories of the engine (E).

The present invention has a fourth feature in that the second electrical component (80) is a vehicle control unit, and the vehicle control unit (80) is fixed to a top surface of the upper half (51).

The present invention has a fifth feature in that the first electrical component (98) is a connector connected to the first harness group (H1), and the connector (98) is fixed to a top surface of the battery tray (61).

The present invention has a sixth feature in that the housing spaces (S1, S2) are configured with a first housing space (S1) formed on an upper side of the battery (B) and a second housing space (S2) formed on a front side of the battery (B), and a positive side wire (97) of the battery (B) is housed in the second housing space (S2).

The present invention has a seventh feature in that a ceiling wall (51a) of the upper half (51) has a shape that inclines downward gradually from a bulge portion (51b) formed at a position closer to a front of a vehicle, the shape inclining backward from the vehicle, and an entrance (52) for the first harness group (H1) is formed at a side of the bulge portion (51b).

The present invention has an eighth feature in that outer sides of the electrical component box (40) in a vehicle width direction are open such that side surfaces of the battery (B) are exposed, and are closed off by a cover member (30), as an exterior component, being attached to the electrical component box (40).

Advantageous Effects of Invention

According to the first feature, in an arrangement structure of electrical components applied to a saddled vehicle (1) comprising a pair of right and left main frames (F2) extending behind a head tube (F1), an engine (E) disposed underneath the main frames (F2), and an electrical component box (40) that is disposed between the main frames (F2) and the engine (E) as seen in a side view of the vehicle and houses at least an approximately rectangular shape battery (B), wherein the electrical component box (40) includes: a battery tray (61) that covers at least a body front surface (B1) and a body upper surface (B2) of the battery (B); a lower half (71) that houses the battery (B) and the battery tray (61); and an upper half (51) that covers the lower half (71) from above, a first electrical component (98) and a first harness group (H1) are arranged in housing spaces (S1, S2) formed between the battery tray (61) and the electrical component box (40), and a second electrical component (80) and a second harness group (H2) are arranged on an upper side of the upper half (51). Therefore, since the first harness group and the second harness group are partitioned by the upper half interference between the first harness group and the second harness group can be prevented. In addition, since the first harness group and the battery are partitioned by the battery tray, interference between the first harness group and the battery can be prevented. Thereby, by providing the electrical component box, the respective harness groups are placed while being sorted at predetermined positions, and this prevents wear or the like of harness surfaces, and additionally can enhance assemblability or maintainability of harnesses.

In addition, since the first electrical component and the second electrical component are partitioned by the upper half, interference of each of them with the other part can be prevented. Furthermore, due to the electrical component box having the upper half and lower half, the battery and first harness group can be protected from water, dust or the like.

According to the second feature, at least one of the first harness group (H1) are high voltage harnesses. Therefore, since high voltage harnesses are contained in a predetermined housing space, positions can be easily and surely allocated to the high voltage harnesses that have relatively large diameters and are less flexible.

According to the third feature, at least one of the second harness group (H2) are low voltage harnesses connected to accessories of the engine (E). Therefore, by making the second harness group include low voltage harnesses that are connected to various types of sensors, a fuel injection device or the like and that require frequent maintenance, it becomes possible to perform main maintenance without removing the upper half of the electrical component box.

According to the fourth feature, the second electrical component (80) is a vehicle control unit, and the vehicle control unit (80) is fixed to a top surface of the upper half (51). Therefore, it becomes possible to reduce the number of parts by making the upper half double as a stay for supporting an electronic control unit on the body.

According to the fifth feature, the first electrical component (98) is a connector connected to the first harness group (H1), and the connector (98) is fixed to a top surface of the battery tray (61). Therefore, by making the battery tray double as a stay for supporting, on the body, a large-sized connector provided at an end portion of the first harness group, the number of parts can be reduced.

According to the sixth feature, the housing spaces (S1, S2) are configured with a first housing space (S1) formed on an upper side of the battery (B) and a second housing space (S2) formed on a front side of the battery (B), and a positive side wire (97) of the battery (B) is housed in the second housing space (S2). Therefore, by making the positive side wire of the battery, which is a high voltage harness, to be contained in the second housing space separate from and independent of the first housing space, it becomes easy to move the battery at the time of battery attachment/detachment or charging while the positive side wire is kept attached, thereby enhancing maintainability.

According to the seventh feature, a ceiling wall (51a) of the upper half (51) has a shape that inclines downward gradually from a bulge portion (51b) formed at a position closer to a front of a vehicle, the shape inclining backward from the vehicle, and an entrance (52) for the first harness group (H1) is formed at a side of the bulge portion (51b). Therefore, the first harness group that branches off from a main harness oriented in the body front-rear direction toward the inside in the body width direction can be smoothly guided into the housing space. In addition, connectors are arranged behind the first harness group, and the first harness group and connectors can be arranged efficiently in a minimum necessary housing space.

According to the eighth feature, outer sides of the electrical component box (40) in a vehicle width direction are open such that side surfaces of the battery (B) are exposed, and are closed off by a cover member (30), as an exterior component, being attached to the electrical component box (40). Therefore, since the battery can be accessed by removing the box cover, maintainability of the electrical component box can be enhanced.

DESCRIPTION OF EMBODIMENTS

Figure 1:
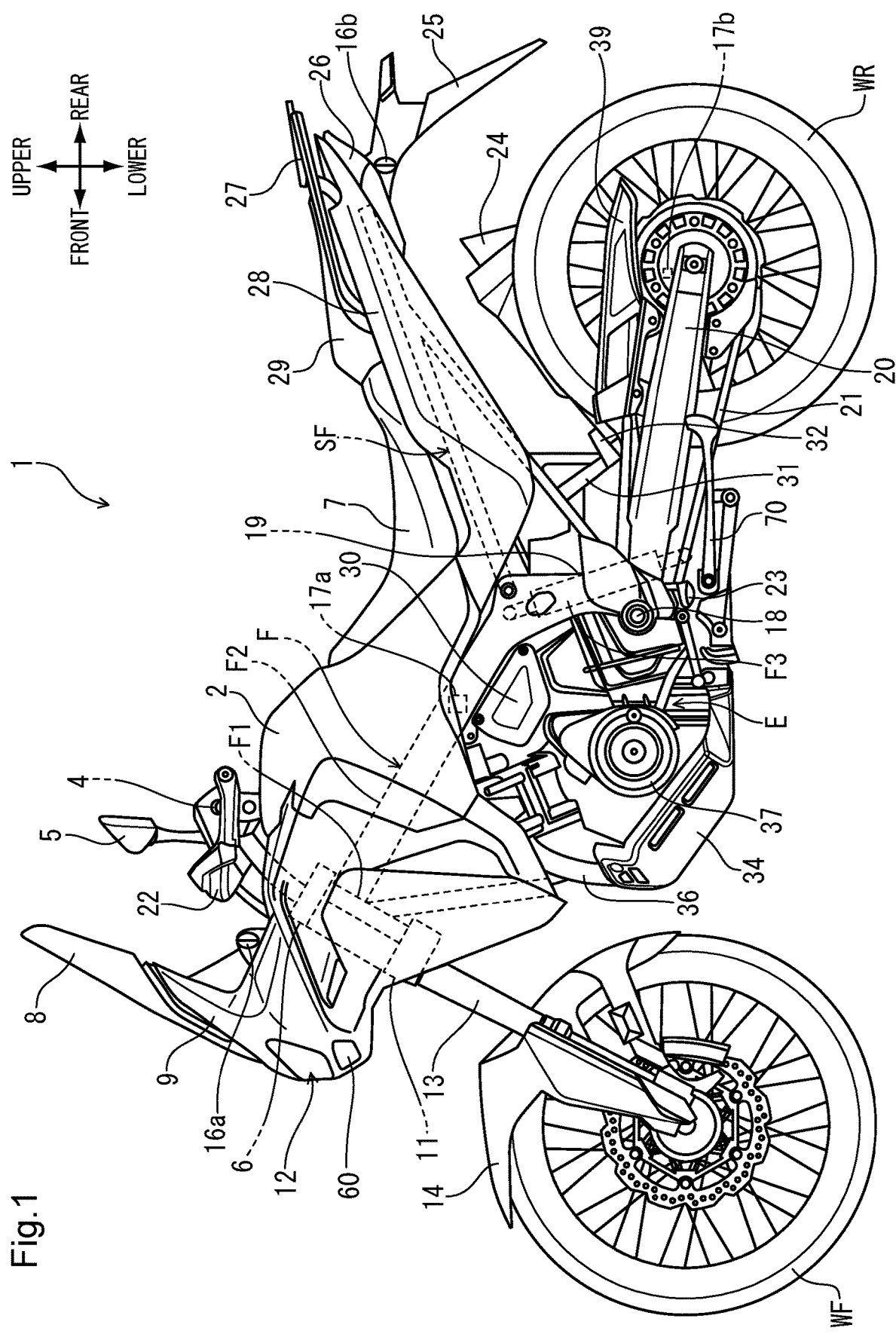
FIG. 1 is a left side view of a motorcycle to which an arrangement structure of electrical components according to an embodiment of the present invention is applied.

FIG. 1 is a left side view of a motorcycle 1 to which an arrangement structure of electrical components according to an embodiment of the present invention is applied. The motorcycle 1 is a dual-sport saddle type vehicle which travels by transmitting a driving force of an engine E as a power source via a drive chain 21 to a rear wheel WR. A pair of left and right main frames F2 configuring a vehicle body frame F have at their front end portions in a vehicle longitudinal direction a head pipe F1 pivotally supporting a steering shaft not depicted for swing motion. A front wheel WF is rotatably supported on a pair of left and right front forks 13 which are supported by a top bridge 6 and a bottom bridge 11 fixed to the steering shaft at upper and lower portions of the head pipe F1. A steering wheel 4 is fixed to the top bridge 6, and a pair of left and right rear-view mirrors 5 and a knuckle guard 22 are mounted to the steering wheel 4.

A front side of the steering wheel 4 is covered by a front cowl 9 which supports a headlight 12 and a screen 8. Between the front cowl 9 and the steering wheel 4, a pair of left and right front turn signal devices 16a are disposed. Below the headlight 12, a cornering light 60 is disposed which is turned on in accordance with a lean angle of the motorcycle 1 in cornering and irradiates a turning direction. The front forks 13 have a front fender 14 covering the front wheel WF from above fixed thereto.

The engine E is disposed below the main frames F2. Below the engine E, an undercover 34 is disposed for protecting front and lower portions of a crankcase 37 and an exhaust pipe 36. Combustion gas in the engine E is discharged from a muffler 24 on the right side in a vehicle widthwise direction via the exhaust pipe 36.

The main frames F2 have a pair of left and right pivot frames F3 coupled to rear end lower portions thereof, and the pivot frames F3 support a pivot 18 of a swing arm 20 rotatably supporting the rear wheel WR. The pivot 18 pivotally supports a front end portion of the swing arm 20 for swing motion. The swing arm 20 is suspended from the main frames F2 by a rear cushion 19 at a position behind the pivot 18. The pivot frames F3 have a pair of left and right foot steps 23 mounted to respective lower end portions thereof. Behind the foot step 23 on the left side in the vehicle widthwise direction, the side-stand 70 is pivotally supported for swing motion. The swing arm 20 has a chain cover 39 for covering the drive chain 21 from above mounted to an upper portion thereof.

In front of the pivot frames F3 and between the main frames F2 and the engine E, an electrical component box 30 for storing an in-vehicle battery and the like is disposed. Above the electrical component box 30 and between the left and right main frames F2, a lean angle sensor 17a detecting a lean angle of the vehicle body is disposed. In the proximity of an axle of the rear wheel WR, a vehicle speed sensor 17b detecting a vehicle speed on the basis of a rotational speed of the rear wheel WR is disposed.

The main frames F2 have a fuel tank 2 disposed at an upper portion thereof and a seat frame SF extending toward the rear upper side of the vehicle body coupled to rear portions thereof. The seat frame SF has a pair of left and right pillion footstep holders 31 supporting pillion footsteps 32 mounted to lower portions thereof.

Behind the fuel tank 2, a front seat 7 and a rear seat 29 supported by the seat frame SF are disposed. The seat frame SF is covered by a rear cowl 28 from outsides in the vehicle widthwise direction. Outside the rear seat 29 in the vehicle widthwise direction, a rear carrier 27 supported by the seat frame SF is disposed. Behind the rear cowl 28, a tail light device 26 and a rear fender 25 are disposed. The rear fender 25 has a pair of left and right rear turn signal devices 16b disposed at base portions thereof.

Figure 2:
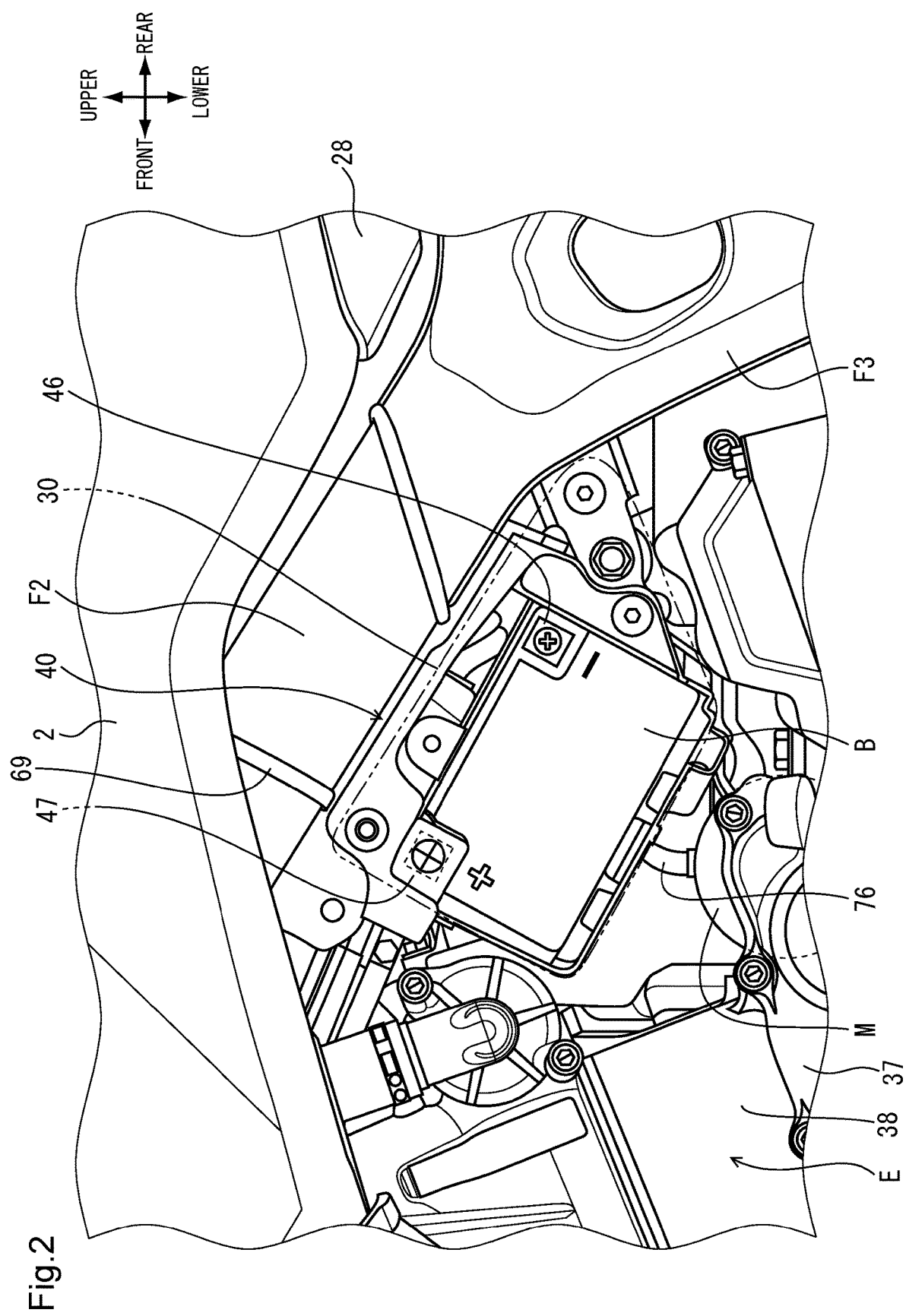
FIG. 2 is a partially enlarged left-side view of a motorcycle showing an electrical component box and structures around it.

FIG. 2 is a partially enlarged left-side view of a motorcycle 1 showing an electrical component box 40 and structures around it. The electrical component box 40 housing a plurality of electrical components including a battery B is contained in a space surrounded by: a crankcase 37 and a cylinder 38 of an engine E; and main frames F2 and pivot frames F3 of a body frame F. The electrical component box 40 houses the battery B such that a negative terminal 46 and a positive terminal 47 are exposed toward the left side in the vehicle width direction when a cover member 30 attached to an end portion of the electrical component box 40 on the left side in the vehicle width direction is removed.

The electrical component box 40 is fixed to the main frames F2 and the pivot frames F3 with fastening members such as bolts such that the top surface of the battery B becomes approximately parallel to the bottom surfaces of the main frames F2. Underneath the electrical component box 40, a starter motor M buried in the crankcase 37 is disposed. A power supply harness 76 connected to the starter motor M extends out of a harness exit (see FIG. 12) formed at a lower portion of the electrical component box 40. Around the main frame F2 on the left side in the vehicle width direction, a retaining band 69 that retains a main harness MH mentioned below (see FIG. 4) is wound at a predetermined position inside the main frame F2.

Figure 3:
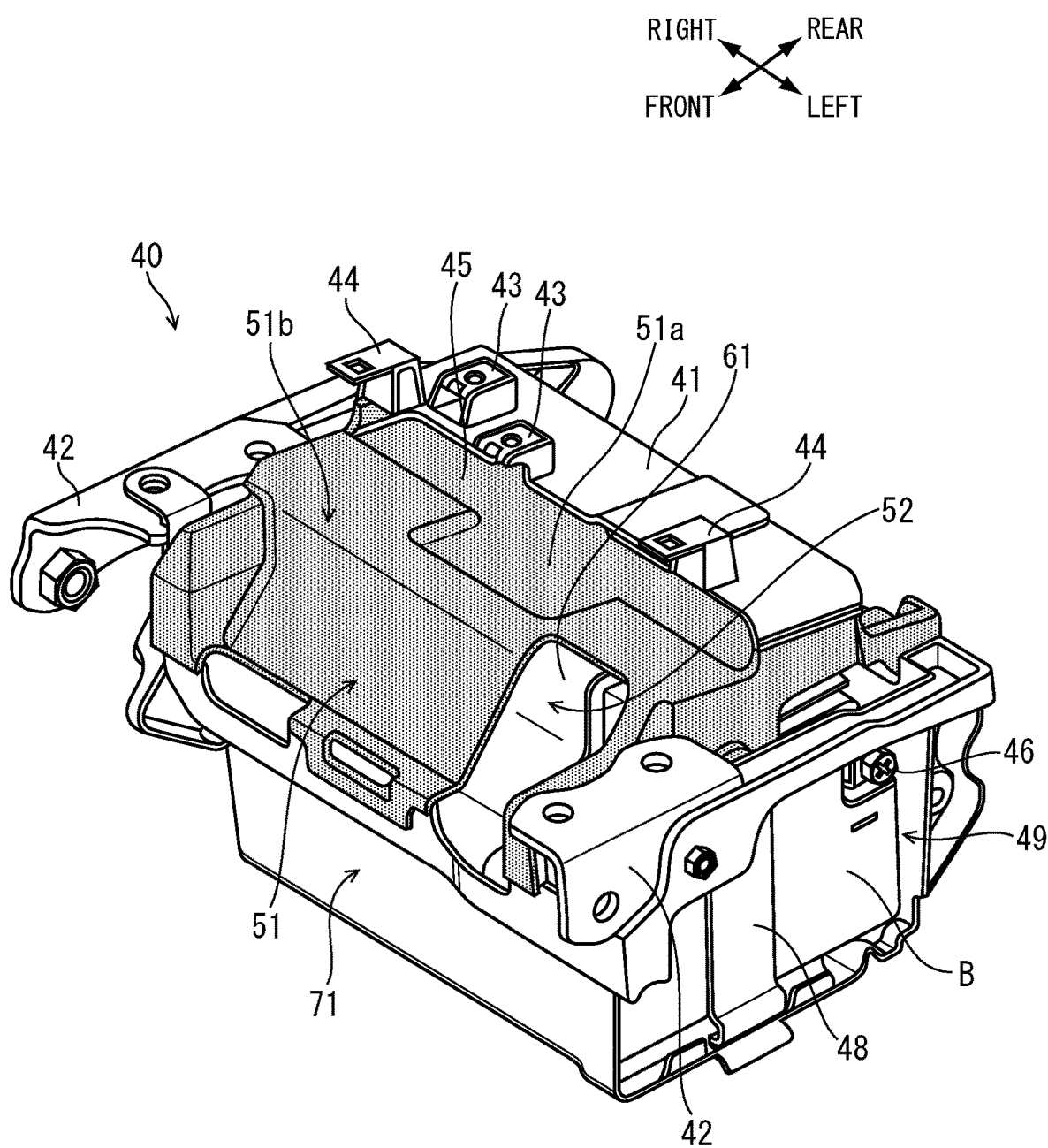
FIG. 3 is a perspective view of the electrical component box as seen from the body front left side.
Figure 4:
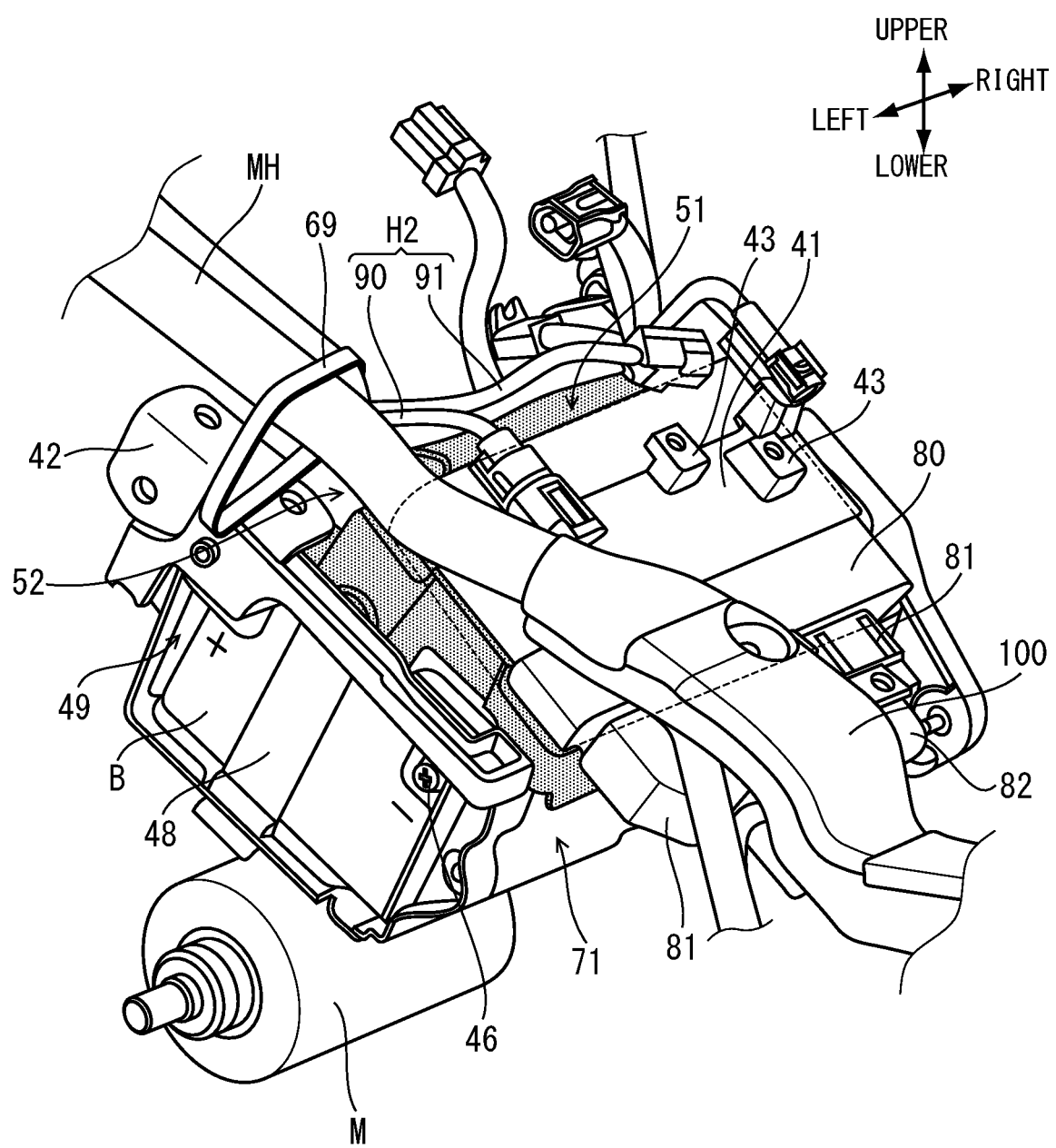
FIG. 4 is a perspective view of the electrical component box as seen from the body rear left side.

FIG. 3 is a perspective view of the electrical component box 40 as seen from the body front left side. FIG. 4 is a perspective view of the electrical component box 40 as seen from the body rear left side. The electrical component box 40 made of a thin tabular member such as a synthetic resin has: a lower half 71 having an opening 49 through which the battery B is exposed to the left side in the vehicle width direction; and an upper half 51 (illustrated as a dotted portion) covering an upper portion of the lower half 71. To an upper end portion that constitutes the lower half 71 and is closer to the body front part, attachment stays 42 are attached as a pair at the right and left for fixing the electrical component box 40 to the bottom surface of the main frame F2. The battery B can be drawn out toward the left side in the vehicle width direction when a rubber belt 48 oriented in the body upward and downward directions is removed.

A ceiling wall 51a of the upper half 51 has a shape consisting of two portions, one of them being inclined upward to the body front side, the other one of them being inclined downward to the body front side, the two portions bordering on a bulge portion 51b which forms the highest positions. To an upper portion of the ceiling wall 51a, a thin tabular ECU holder 41 that retains an electronic control unit 80 (hereinafter, indicated as the ECU 80) as a second electrical component is attached. The ECU 80 has a thin box-type shape, and is retained in a space formed between the upper half 51 and the ECU holder 41. The top surface of the ECU holder 41 is provided with a plurality of bosses 43, 44 that retain connectors and the like.

A front portion that constitutes the upper half 51 and is on the left side in the vehicle width direction is provided with a harness entrance 52 that allows harnesses to be introduced into the electrical component box 40 from the left side in the vehicle width direction, the harness entrance 52 being formed by cutting out a portion in front of the bulge portion 51b. By providing the harness entrance 52 on the left side of the bulge portion 51b, it becomes easy to guide, toward the right side in the vehicle width direction, harnesses introduced from above.

With reference to FIG. 4, the main harness MH oriented in the body front-rear direction is placed to contact, due to the retaining band 69, the inner side surface of the main frame F2 on the left side in the vehicle width direction. The upper half 51 and the ECU 80 retained by the upper half 51 are disposed so as to be contained between the left and right main frames F2. To the rear end surface of the ECU 80, two ECU connectors 81 connected to harnesses 82 are connected. To the top surface that constitutes the main harness MH and is on the body rear side, a protector 100 made of a thin tabular member is attached.

The main harness MH passes by the harness entrance 52 provided to the upper half 51. Then, at a position between the retaining band 69 and the harness entrance 52, a first harness group H1 (see FIG. 6) and a second harness group H2 that are mentioned below branch off from the side surface of the main harness MH to the inside of the body. In the state shown in FIG. 4, harnesses 90, 91 constituting the second harness group H2 are placed in the space in front of the ECU 80. The first harness group H1 is guided from the harness entrance 52 provided to the upper half 51 into the electrical component box 40.

Figure 5:
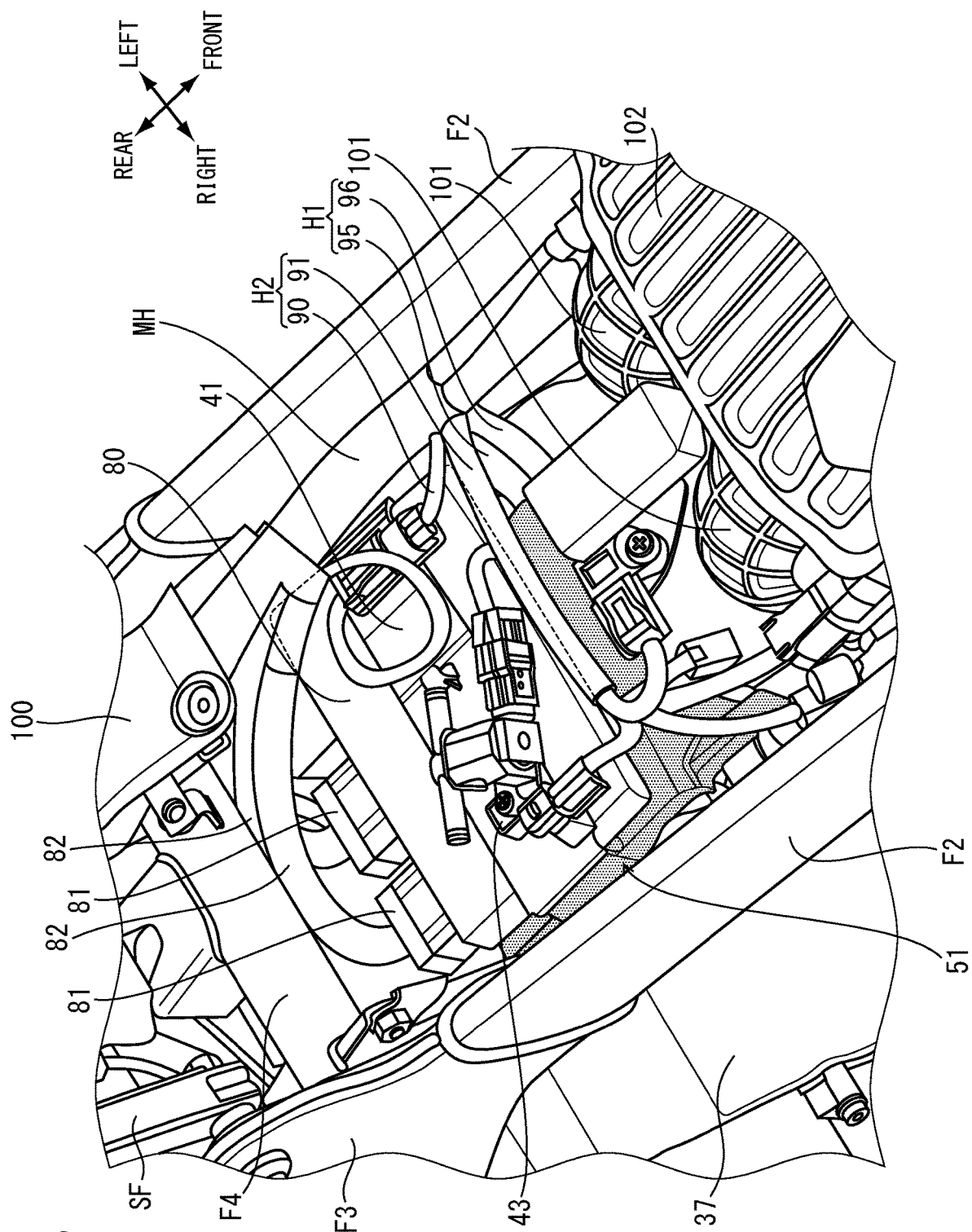
FIG. 5 is a perspective view of the electrical component box attached to the body as seen from the body front right side.

FIG. 5 is a perspective view of the electrical component box 40 attached to the body as seen from the body front right side. When the electrical component box 40 is attached at a predetermined position of the body frame F, the upper half 51 and the ECU 80 are contained between the left and right main frames F2. In the space in front of the upper half 51, intake pipes 101 to feed external air filtered at an air cleaner box 102 to a throttle body are disposed as a pair at the right and left.

The harnesses 82 connected to the two ECU connectors 81 branch off from the main harness MH near the ECU holder 41. A cross frame F4 is disposed behind the ECU connectors 81. The cross frame F4 is oriented in the vehicle width direction, couples the left and right pivot frames F3 and additionally supports the upper end of a rear cushion 19.

The second harness group H2 that branches off from the main harness MH toward the middle of the body is mainly constituted by low voltage harnesses connected to various types of sensors as accessories of the engine E or injectors. A plurality of connectors are connected to the tip of the harness 91. The first harness group H1 that branches off from the main harness MH and is placed at the harness entrance 52 includes high voltage harnesses that supply power to a headlight 12 or the like.

Figure 6:
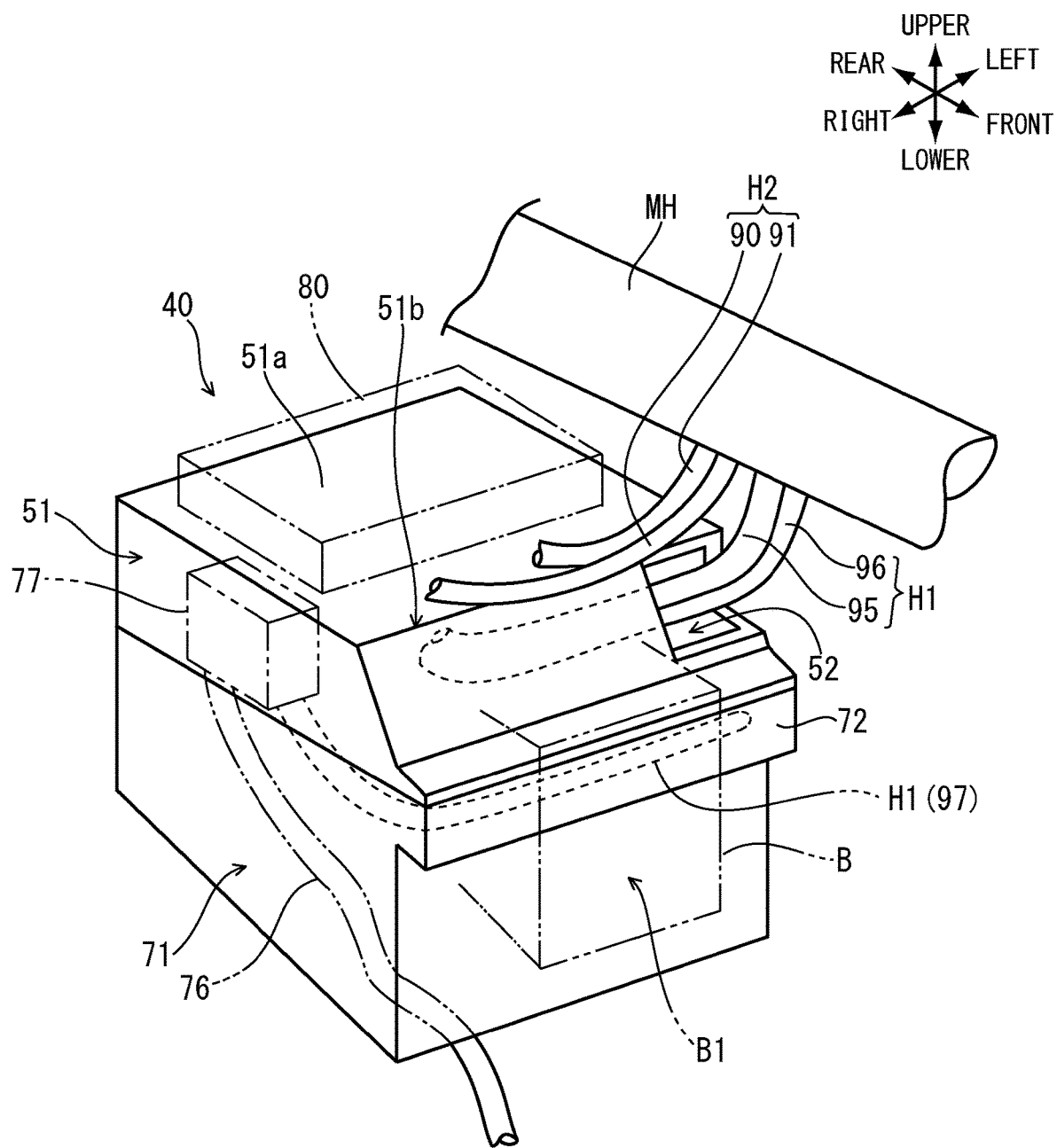
FIG. 6 is a schematic perspective view showing the structure of the electrical component box.
Figure 7:
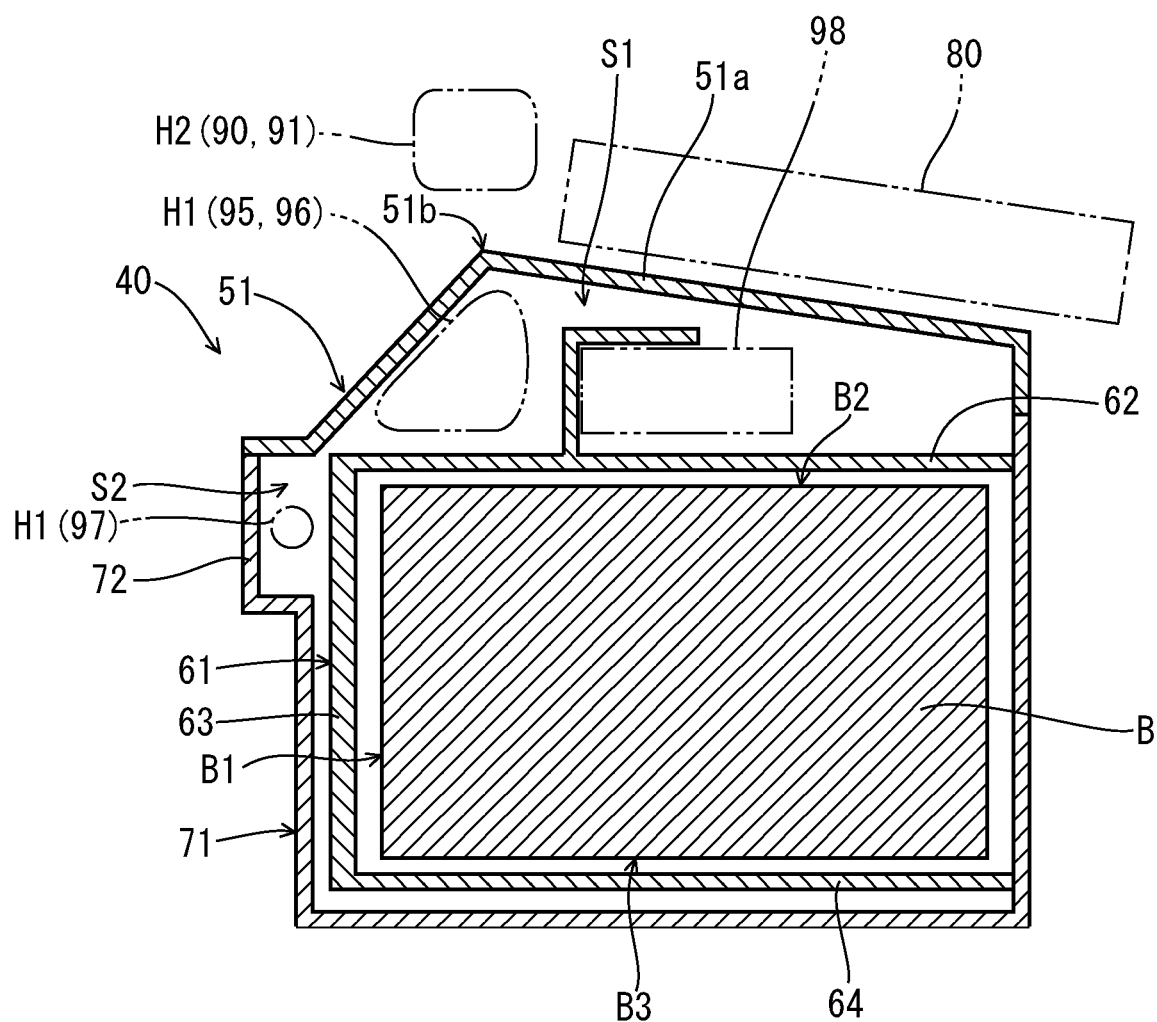
FIG. 7 is a schematic sectional view showing the structure of the electrical component box.

FIG. 6 is a schematic perspective view showing the structure of the electrical component box 40. FIG. 7 is a schematic sectional view showing the structure of the electrical component box 40. As described above, the first harness group H1 that branches off from the main harness MH is guided from the harness entrance 52 of the upper half 51 into the electrical component box 40. The second harness group 142 that branches off from the main harness MH is guided, at an upper portion of the upper half 51, to the space in front of the ECU 80. Thereby, since the first harness group H1 and the second harness group 142 are partitioned by the upper half 51, interference between the first harness group H1 and the second harness group H2 can be prevented.

The battery B is disposed at a position that is in the electrical component box 40 and is closer to the left in the vehicle width direction, and on the right side of the battery B in the vehicle width direction, a plurality of electrical components such as a starter relay 77 are housed. A positive side harness 97 as the first harness group H1 connected to the positive terminal 47 of the battery B is introduced into the starter relay 77 through the space in front of the battery B. The power supply harness 76 that extends from the starter relay 77 and is connected to the starter motor M is placed underneath from the harness exit (see FIG. 12) provided in the lower half 71.

With reference to FIG. 7, the battery B is retained in a battery tray 61 inside the lower half 71. The battery tray 61 made of a thin tabular member such as a synthetic resin has: a front plate portion 63 facing a front surface B1 of the battery B; a top plate portion 62 facing a top surface B2 of the battery B; and a bottom plate portion 64 facing a bottom surface B3 of the battery B.

A first housing space S1 is formed between the top plate portion 62 of the battery tray 61 and the upper half 51, and in this first housing space S1, the first harness group H1 consisting of high voltage harnesses 95, 96 and a high voltage connector 98 as a first electrical component are contained. A second housing space S2 is formed between the front plate portion 63 of the battery tray 61 and a protruding portion 72 of the lower half 71, and in this second housing space S2, the positive side harness 97 connected to the positive terminal 47 of the battery B is contained.

The arrangement structure of electrical components according to the present embodiment is configured in the following manner. The electrical component box 40 includes: the battery tray 61 that covers at least the body front surface B1 and body upper surface B2 of the battery B; the lower half 71 that houses the battery B and the battery tray 61; and the upper half 51 that covers the opening of the lower half 71 from above. The high voltage connector (first electrical component) 98 and first harness group H1 are arranged in the first and second housing spaces S1, S2 formed between the battery tray 61 and the upper half 51. The ECU (second electrical component 80) and second harness group H2 are arranged on the upper side of the upper half 51.

Accordingly, since the first harness group and the second harness group are partitioned by the upper half, interference between the first harness group and the second harness group can be prevented. Further, by providing the electrical component box 40, the respective harness groups are placed while being sorted at predetermined positions, and this prevents wear or the like of harness surfaces, and additionally can enhance assemblability or maintainability of harnesses.

In addition, since the high voltage connector 98 and the ECU 80 are partitioned by the upper half, interference of each of them with the other part can be prevented. Furthermore, due to the electrical component box 40 having the upper half 51 and lower half 71, the battery B, the high voltage connector 98 and first harness group H1 can be protected from water, dust or the like. By fixing, to the battery tray 61, the large-sized high voltage connector 98 provided at an end portion of the first harness group H1, it is also possible to reduce the number of parts by doing away with a dedicated stay.

Furthermore, high voltage harnesses constituting the first harness group H1 have relatively large diameters and are less flexible in order to allow flow of high voltage, and by making them contained in the first housing space S1 and second housing space S2, it becomes easy to retain them at predetermined positions.

The second harness group H2 is disposed above the upper half 51. The second harness group H2 includes low voltage harnesses that are connected to various types of sensors, a fuel injection device or the like and require frequent maintenance, and it becomes possible to perform main maintenance without removing the upper half 51 of the electrical component box 40.

Since the ECU 80 as a second electrical component is fixed to the top surface of the upper half 51, it is possible to reduce the number of parts by making the upper half 51 double as a stay for supporting the ECU 80 on the body. Furthermore, by making the positive side harness 97 of the battery B, which is a high voltage harness, contained in the second housing space S2 separate from and independent of the first housing space S1, it is made easy to move the battery B at the time of battery attachment/detachment or charging while the positive side harness 97 is kept attached, thereby enhancing maintainability.

Figure 8:
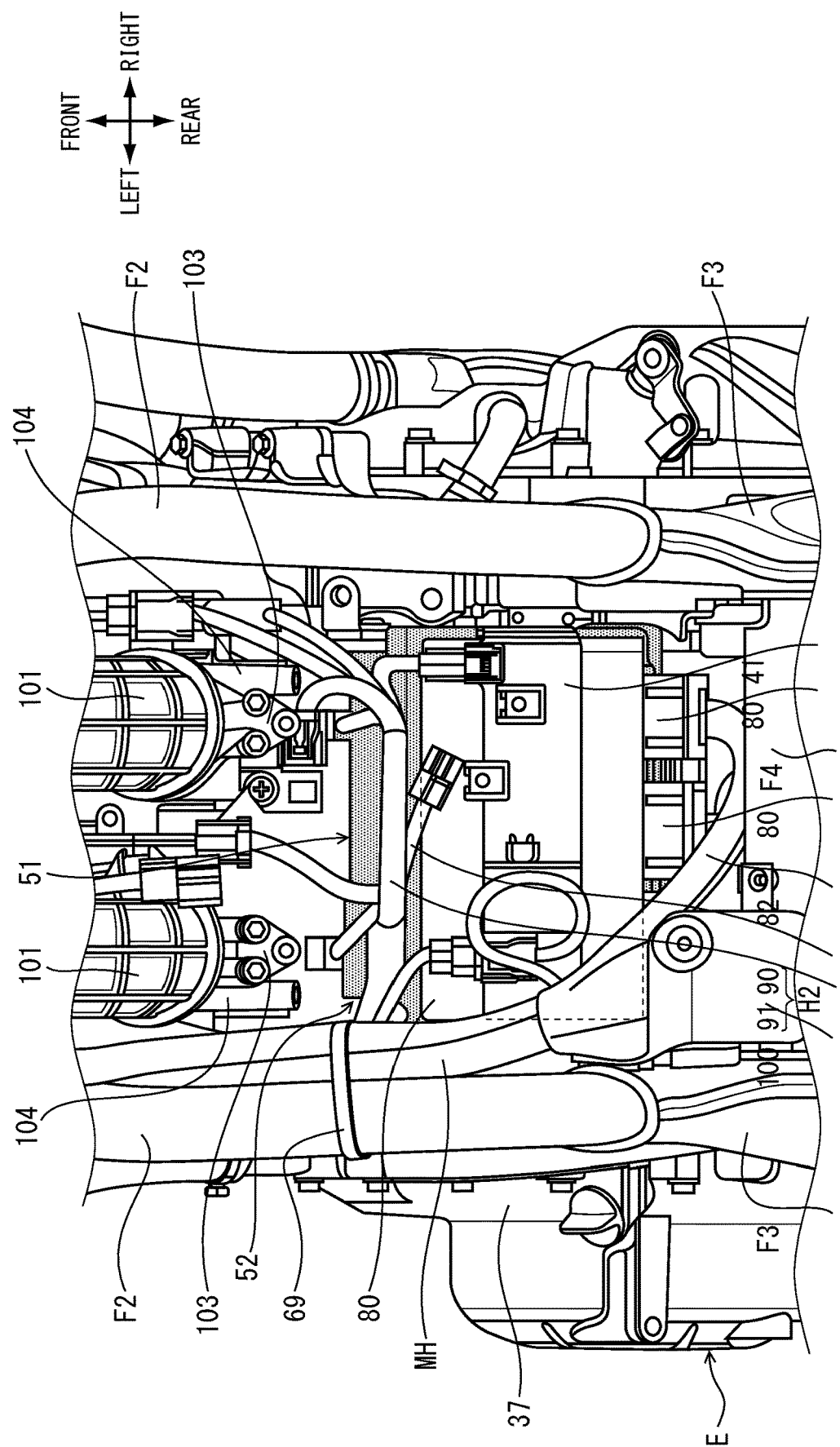
FIG. 8 is a plan view showing the state where the electrical component box is attached to the body.

FIG. 8 is a plan view showing the state where the electrical component box 40 is attached to the body. Tips of the second harness group H2 are connected to injectors 103, various types of sensors or the like buried in throttle bodies 104. Although not shown in this figure, fuel hoses coupled with the injectors 103, a breather hose extending from a fuel tank 2, and the like are placed near the second harness H2, and also these hoses can be prevented from contacting high voltage harnesses.

Figure 9:
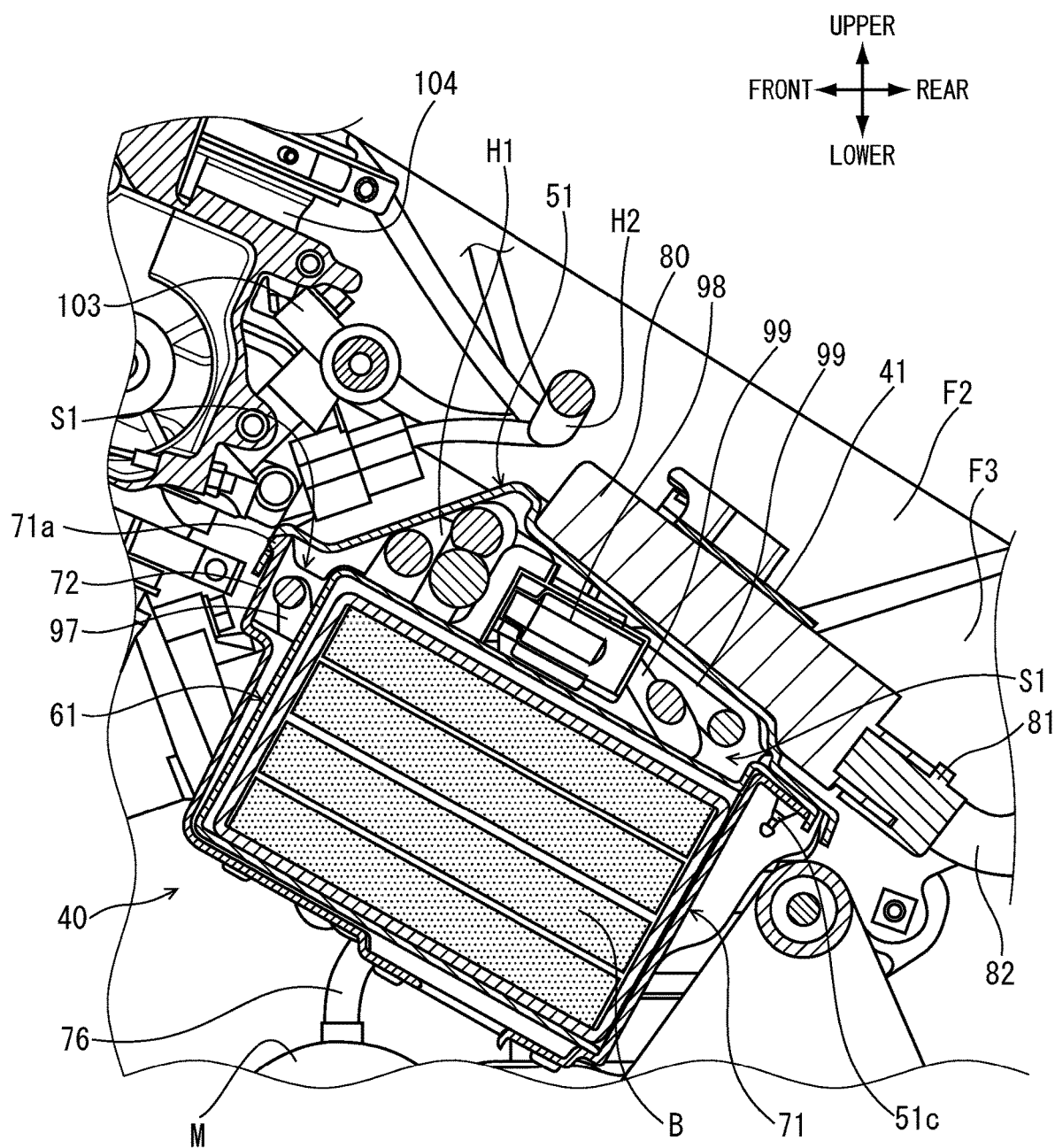
FIG. 9 is a sectional-view of the electrical component box corresponding to the schematic sectional view of FIG. 7.
Figure 10:
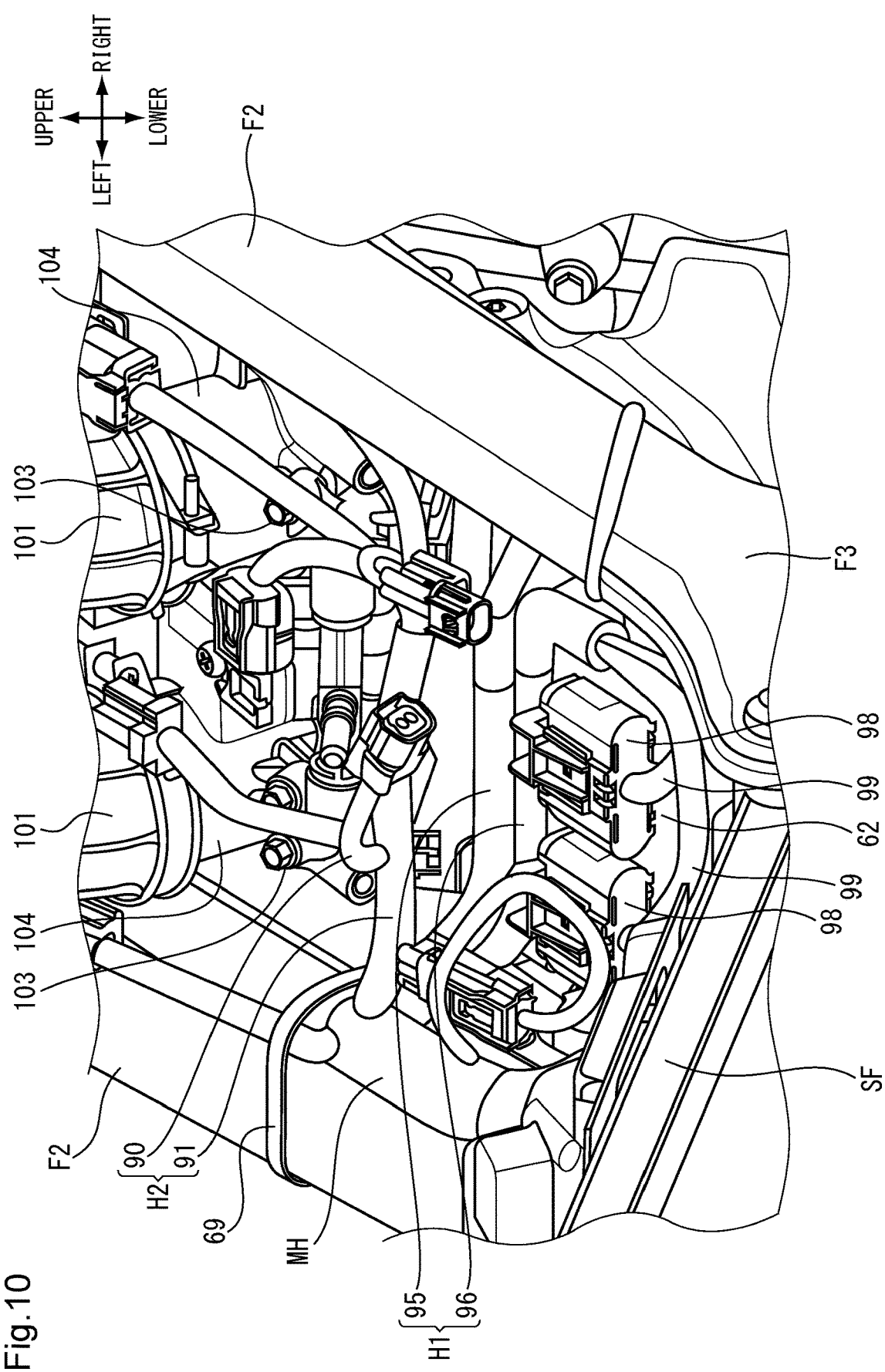
FIG. 10 is a perspective view showing the state where the upper half and ECU are removed while the state of placement of harnesses is maintained.

FIG. 9 is a sectional-view of the electrical component box 40 corresponding to the schematic sectional view of FIG. 7. FIG. 10 is a perspective view showing the state where the upper half 51 and ECU 80 are removed while the state of placement of harnesses is maintained. The volume of the first housing space S1 formed above the battery B gradually increases toward the body front side due to the shape of the upper half 51. Along with this, by disposing the first harness group H1, the high voltage connector 98 and a high voltage harness 99 connected to the high voltage connector 98 in this order from the body front side, maximum utilization of a small space becomes possible, and the respective electrical components are housed efficiently. The first housing space S1 formed in the space in front of the battery B allows housing of only the positive side harness 97 connected to the battery B due to the protruding portion 72 being formed in the lower half 71. Thereby, the positive side harness 97 with the highest maintenance frequency in the first harness group H1 is separated from other harnesses, and even if the positive side harness 97 is extracted at the time of replacement or charging of the battery B, the other harnesses are not affected.

Coupling between the upper half 51 and the lower half 71 is completed by causing an engaging protrusion 51c extending downward from the rear end of the upper half 51 to be engaged with the lower half 71, and additionally causing an engaging protrusion 71a formed at the front edge of the lower half 71 to be engaged with the upper half 51. Thereby, the assembling work of the electrical component box 40 becomes easy, and additionally the upper half 51 can be removed from the lower half 71 easily at the time of maintenance.

With reference to FIG. 10, if the electrical component box 40 in the vehicle-mounted state is removed from the upper half 51, it becomes possible to access the first harness group H1 placed above the battery B. The high voltage harness 99 connected to the high voltage connector 98 branches off from the harness 96 included in the first harness group H1. Near the injectors 103 attached as a pair at the right and left to the throttle bodies 104, connectors connected to connecting parts of fuel hoses and respective sensors are densely arranged.

Figure 11:
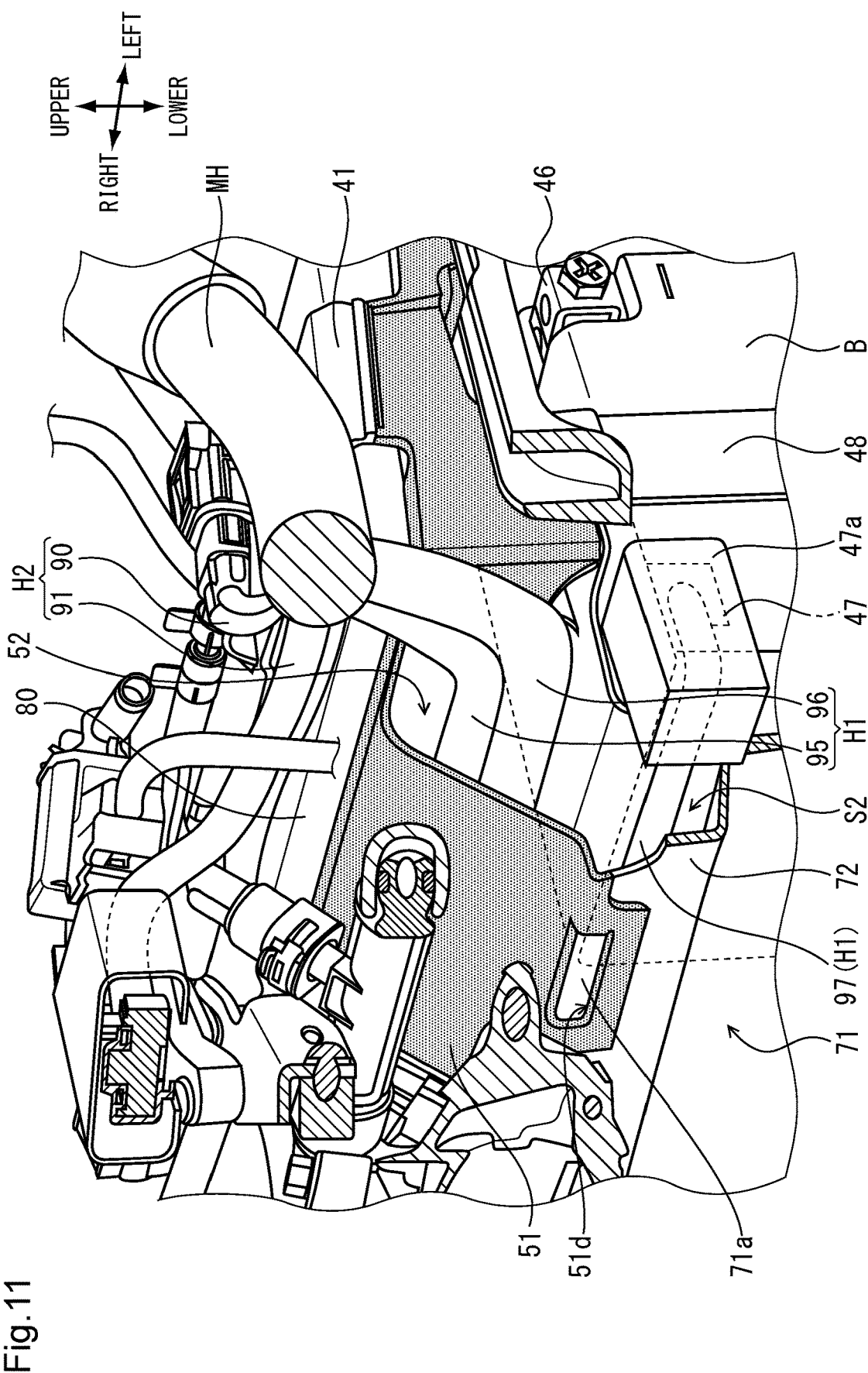
FIG. 11 is a partially enlarged view of the electrical component box as seen from the body front left side.
Figure 12:
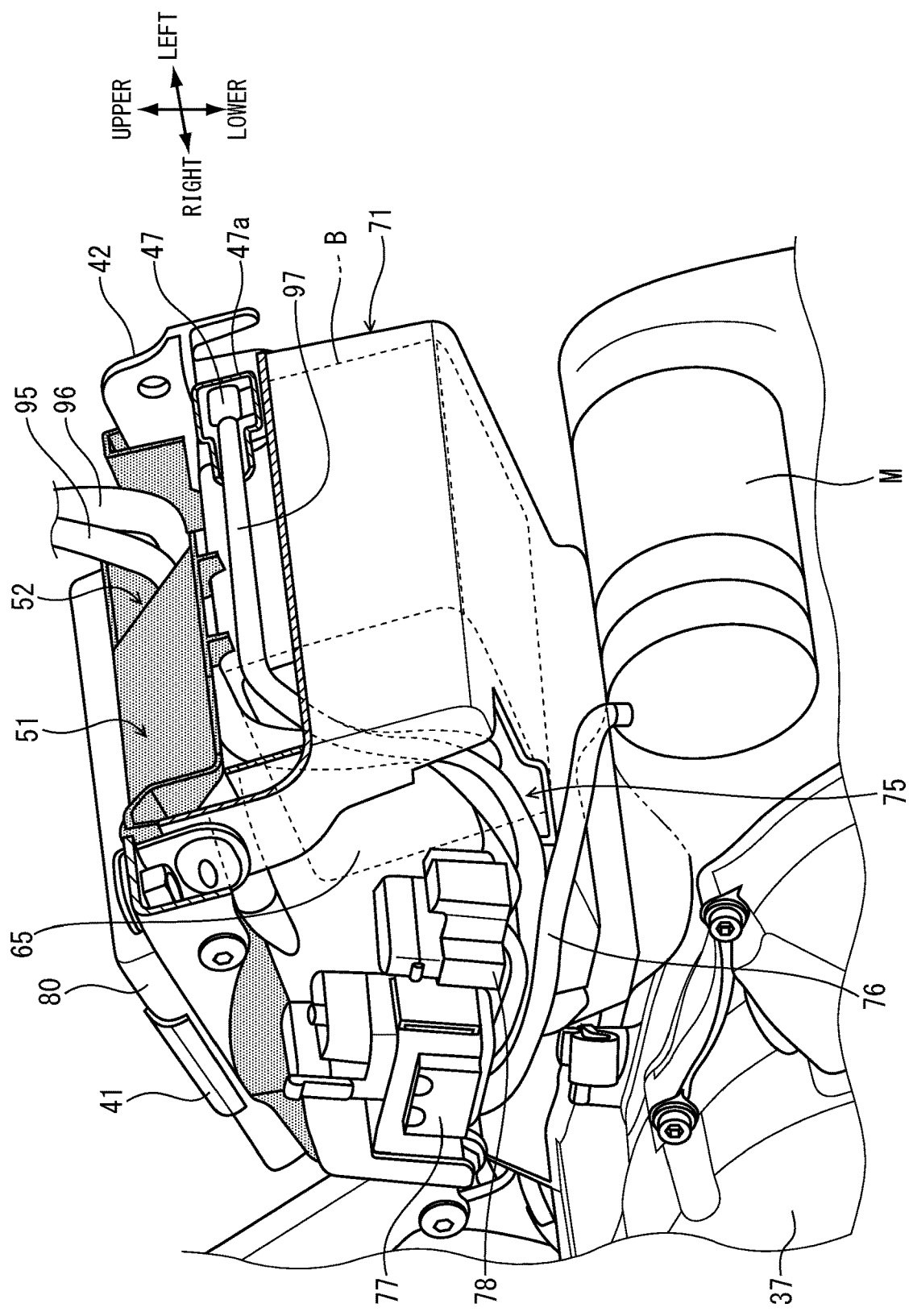
FIG. 12 is a partial cross-sectional perspective view of the electrical component box as seen from the body front right side.

FIG. 11 is a partially enlarged view of the electrical component box 40 as seen from the body front left side. FIG. 12 is a partial cross-sectional perspective view of the electrical component box 40 as seen from the body front right side. As described above, the harnesses 95, 96 as the first harness group H1 that branch off downward from the main harness MH are guided from the harness entrance 52 formed in the upper half 51 into the electrical component box 40. Since the harness entrance 52 is opened toward the left side in the vehicle width direction, it becomes easy to place the harnesses 95, 96 toward the right side in the vehicle width direction while the bending amounts of the harnesses 95, 96 are reduced to the minimum.

A positive terminal 47b of the battery B is covered by a rubber-made terminal cover 47a. The positive side harness 97 connected to the positive terminal 47 passes through the second housing space S2 formed in the space in front of the battery B and is placed toward the right side in the vehicle width direction. An opening 51d that contains the engaging protrusion 71a formed in the lower half 71 is formed at a front end portion of the upper half 51.

A space inside the electrical component box 40 and on the right side of the battery B in the vehicle width direction can house a plurality of electrical components such as a blinker relay 78 beside the starter relay 77. These electrical components can be fixed to the sidewall of the battery tray 61 on the right side in the vehicle width direction. Thereby, the plurality of electrical components can be retained at predetermined positions in the electrical component box 40 without providing dedicated stays. The power supply harness 76 extending from a lower portion of the starter relay 77 passes through a through-hole 75 formed at a bottom portion of the lower half 71, is placed downward and is connected to the starter motor M. By arranging electrical components inside and around the electrical component box 40 densely, the length of each harness can be shortened.

The form of a saddled vehicle, the shape or structure of an electrical component box, the shapes or arrangement of housing spaces, the shape or structure of a battery tray, the types of electrical components, the shapes or arrangement of electrical components, the types or numbers of harnesses, the thicknesses or lengths of harnesses, and the like are not limited to the above-mentioned embodiments, but various modifications can be made thereto. The arrangement structure of electrical components according to the present invention can be applied to various vehicles not limited to motorcycles, but including three-wheel or four-wheel saddled vehicles and the like.

EXPLANATION OF SIGN

1 . . . motorcycle (saddled vehicle), 30 . . . cover member, 40 . . . electrical component box, 51 . . . upper 51a . . . ceiling wall, 51b . . . bulge portion, 52 . . . harness entrance, 61 . . . battery tray, 71 . . . lower half 80 . . . vehicle control unit (second electrical component, ECU), 95, 96 . . . harnesses (first harness group), 97 . . . positive side harness (first harness group), 98 . . . high voltage connector (first electrical component), B . . . battery, B1 . . . front surface of the battery, B2 . . . top surface of the battery, F . . . vehicle body frame, F1 . . . head pipe, F2 . . . main frame, E . . . engine, H1 . . . first harness group, H2 . . . second harness group, S1 . . . first housing space (housing space), S2 . . . second housing space (housing space)

The invention claimed is:

1. An arrangement structure of electrical components applied to a saddled vehicle comprising:
a pair of right and left main frames extending behind a head tube;
an engine disposed underneath the main frames; and
an electrical component box that is disposed between the main frames and the engine as seen in a side view of the vehicle and houses at least an approximately rectangular shape battery,
wherein the electrical component box includes:
a battery tray that covers at least a body front surface and a body upper surface of the battery;
a lower half that houses the battery and the battery tray; and
an upper half that covers the lower half from above,
wherein a first electrical component and a first harness group are arranged in housing spaces formed between the battery tray and the electrical component box, and
wherein a second electrical component and a second harness group are arranged on an upper side of the upper half.

2. The arrangement structure of electrical components according to claim 1, wherein at least one of the first harness group are high voltage harnesses.

3. The arrangement structure of electrical components according to claim 1, wherein at least one of the second harness group are low voltage harnesses connected to accessories of the engine.

4. The arrangement structure of electrical components according to claim 1,
wherein the second electrical component is a vehicle control unit, and
wherein the vehicle control unit is fixed to a top surface of the upper half.

5. The arrangement structure of electrical components according to claim 1,
wherein the first electrical component is a connector connected to the first harness group, and
the connector is fixed to a top surface of the battery tray.

6. The arrangement structure of electrical components according to claim 1,
wherein the housing spaces are configured with a first housing space formed on an upper side of the battery and a second housing space formed on a front side of the battery, and
wherein a positive side wire of the battery is housed in the second housing space.

7. The arrangement structure of electrical components according to claim 1,
wherein a ceiling wall of the upper half has a shape that inclines downward gradually from a bulge portion formed at a position closer to a front of a vehicle, the shape inclining backward from the vehicle, and
wherein an entrance for the first harness group is formed at a side of the bulge portion.

8. The arrangement structure of electrical components according to claim 1, wherein outer sides of the electrical component box in a vehicle width direction are open such that side surfaces of the battery are exposed, and are closed off by a cover member, as an exterior component, being attached to the electrical component box.

9. The arrangement structure of electrical components according to claim 2, wherein at least one of the second harness group are low voltage harnesses connected to accessories of the engine.

10. The arrangement structure of electrical components according to claim 2,
wherein the second electrical component is a vehicle control unit, and
wherein the vehicle control unit is fixed to a top surface of the upper half.

11. The arrangement structure of electrical components according to claim 3,
wherein the second electrical component is a vehicle control unit, and
wherein the vehicle control unit is fixed to a top surface of the upper half.

12. The arrangement structure of electrical components according to claim 2,
wherein the first electrical component is a connector connected to the first harness group, and
the connector is fixed to a top surface of the battery tray.

13. The arrangement structure of electrical components according to claim 3,
wherein the first electrical component is a connector connected to the first harness group, and
the connector is fixed to a top surface of the battery tray.

14. The arrangement structure of electrical components according to claim 4,
wherein the first electrical component is a connector connected to the first harness group, and
the connector is fixed to a top surface of the battery tray.

15. The arrangement structure of electrical components according to claim 2,
wherein the housing spaces are configured with a first housing space formed on an upper side of the battery and a second housing space formed on a front side of the battery, and
wherein a positive side wire of the battery is housed in the second housing space.

16. The arrangement structure of electrical components according to claim 3,
wherein the housing spaces are configured with a first housing space formed on an upper side of the battery and a second housing space formed on a front side of the battery, and
wherein a positive side wire of the battery is housed in the second housing space.

17. The arrangement structure of electrical components according to claim 4,
wherein the housing spaces are configured with a first housing space formed on an upper side of the battery and a second housing space formed on a front side of the battery, and
wherein a positive side wire of the battery is housed in the second housing space.

18. The arrangement structure of electrical components according to claim 5,
wherein the housing spaces are configured with a first housing space formed on an upper side of the battery and a second housing space formed on a front side of the battery, and
wherein a positive side wire of the battery is housed in the second housing space.

19. The arrangement structure of electrical components according to claim 2,
wherein a ceiling wall of the upper half has a shape that inclines downward gradually from a bulge portion formed at a position closer to a front of a vehicle, the shape inclining backward from the vehicle, and
wherein an entrance for the first harness group is formed at a side of the bulge portion.

20. The arrangement structure of electrical components according to claim 3,
wherein a ceiling wall of the upper half has a shape that inclines downward gradually from a bulge portion formed at a position closer to a front of a vehicle, the shape inclining backward from the vehicle, and
wherein an entrance for the first harness group is formed at a side of the bulge portion.

* * * * *